No. 12,395. REISSUED OCT. 31, 1905.
C. HEILRATH.
FILTER.
APPLICATION FILED OCT. 9, 1905
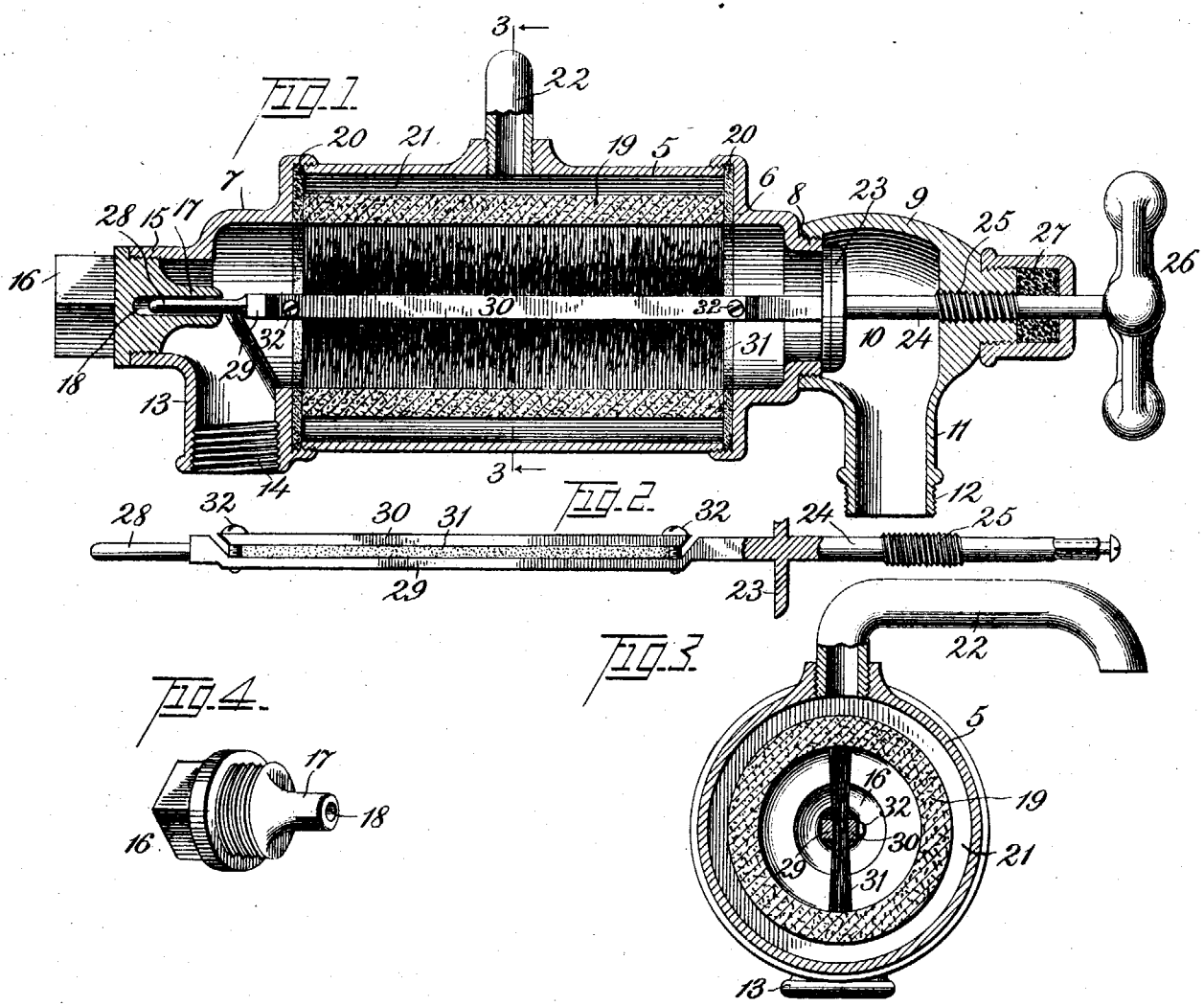
Witnesses:
M. C. Lyddane
B. G. Foster
Christian Heilrath, Inventor:
By E. G. Siggers
Attorney

UNITED STATES PATENT OFFICE.

CHRISTIAN HEILRATH, OF SACRAMENTO, CALIFORNIA.

FILTER.

No. 12,395 Specification of Reissued Letters Patent. Reissued Oct. 31, 1905.

Original No. 800,298, dated September 26, 1905. Application for reissue filed October 9, 1905. Serial No. 282,054.

*To all whom it may concern:*

Be it known that I, CHRISTIAN HEILRATH, a citizen of the United States, residing at Sacramento, in the county of Sacramento and State of California, have invented a new and useful Filter, of which the following is a specification.

The present invention relates more particularly to water-filters for household purposes. The principal object is to provide a novel structure of a simple nature which constitutes, in effect, a filtering-faucet—that is to state, unfiltered water under the direct pressure in the main can be drawn off, and when so drawn the filter is automatically cleaned.

The preferred embodiment of the invention is illustrated in the accompanying drawings, wherein—

Figure 1 is a longitudinal sectional view through such a filter. Fig. 2 is a plan view, partly in section, of the valve-stem. Fig. 3 is a cross-sectional view through the filter on the line 3 3 of Fig. 1. Fig. 4 is a detail perspective view of the guide-plug.

Similar reference-numerals designate corresponding parts in all the figures of the drawings.

In the embodiment illustrated a tubular casing 5 is employed, upon the ends of which are screwed caps 6 and 7, the cap 6 having a centrally-disposed boss 8, on which is threaded a nozzle 9. The nozzle 9 has a valve-chamber 10 and a depending nipple 11, the free terminal of which may be threaded, as shown at 12, to receive a hose-coupling. The outer end of the boss 8, located within the nozzle 9, constitutes a valve-seat. The cap 7, threaded upon the other end of the casing, is provided with an offset inlet-nipple 13, which is interiorly threaded, as shown at 14, so that the same may be attached to an ordinary water-supply pipe. The said cap 7 is furthermore provided with a centrally-disposed boss 15, the axis of which is coincident with the axis of the casing 5 and cap 6 and is interiorly threaded to receive a plug 16, having an extension 17, provided with a centrally-disposed guideway 18.

Clamped between the caps 6 and 7 and arranged within the annular casing 5 is a filtering-barrel 19, which may be of any desired material and is open-ended, the bore thereof being of substantially the same diameter as the bores of the caps 6 and 7. Packing-rings 20 are interposed between the ends of the filtering-barrel and the inner walls of the caps, said rings preferably extending outwardly a sufficient distance to be engaged between the caps and the ends of the casing, thereby constituting packings for both joints. The filtering-barrel 19 is spaced from the walls of the casing, and thus formed between the same is a chamber 21 for the filtered water that passes through the barrel. This water finds an outlet through a suitable nozzle 22, which is threaded into one side of the casing 5 and has its bore in communication with the chamber 21.

The water-supply from the inlet-cap 7 through the nozzle 10 is controlled by a valve 23, carried by a valve-stem 24, the outer end portion of which is threaded, as shown at 25, in the head of the nozzle and extends exteriorly thereof, being provided with a suitable hand-wheel 26. A packing-gland 27 serves to prevent leakage through the thread-joint. The valve carried by the stem operates in the chamber 10 of the nozzle and is of course movable into and out of coaction with the valve-seat 8 when the stem is actuated. This stem is extended exteriorly through the filtering-barrel and has its inner end reduced, as shown at 28, said end being movable in the guideway 18 of the plug. The portion between the reduced end and the valve comprises clamping-sections 29 and 30, the section 29 forming an integral part of the stem and being inset, as shown in Fig. 2, to form a seat which receives the section 30, and also receives a brush-body 31, that is arranged between said sections. Screws 32, connecting the sections, serve to clamp the same upon the body. The brush, as shown in Figs. 1 and 3, extends on opposite sides of the stem and has its margins in engagement with the inner wall of the filtering-barrel.

It will be apparent that water conducted through the inlet-nipple 13 will pass through the barrel 19, and thus be relieved of all dirt and sediment, said filtered water escaping through the nozzle 22, while the sediment will be collected on the inner walls of the barrel. If now unfiltered water is to be drawn, it is only necessary to turn the hand-wheel 26 to open the valve 23, whereupon the brush will be revolved within the barrel, and the sediment collected thereon will thus be loosened and carried out with the water which flows through the nozzle 11, thereby cleansing the filter. Now if the illustrated structure is employed for household purposes in the place of an ordinary faucet it will be seen that filtered water will be constantly delivered and that as often as the faucet is opened to draw unfiltered water the filter is cleaned. Moreover, as in the course of the day such faucet will ordinarily be used considerably it will be apparent that the filter will be maintained comparatively free from dirt and sediment.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a filter, the combination with a tubular casing having an inlet at one end and a discharge-nozzle at the other end, of a valve-seat located in said nozzle, an open-ended filtering-barrel extending longitudinally through the casing in spaced relation to the walls thereof and having its interior in communication with the inlet and with the nozzle, a delivery device communicating with the spaces between the barrel and casing, a guideway located in substantial alinement with the casing and the barrel and arranged at the end of the same opposite the nozzle, a valve-stem having one end threaded into the nozzle and projecting from the same, said stem extending through the barrel and having its inner end movably mounted in the guideway, a valve mounted on the stem and operating in the nozzle into and out of coaction with the valve-seat, and a brush carried by the stem between the valve and the inner guided end, said brush operating against the inner wall of the filtering-barrel.

2. In a filter, the combination with a tubular casing, having an inlet at one end and a discharge-nozzle at the other, of an open-ended filtering-barrel extending longitudinally through the casing in spaced relation to the walls thereof and having its interior in communication with the inlet and with the nozzle, a delivery device communicating with the space between the barrel and casing, a guideway located in substantial alinement with the inner end of the barrel, a valve-stem having one end mounted in the wall of the nozzle and its other end located in the guideway, said stem between the guided ends passing through the barrel and comprising clamping-sections, a brush arranged between the sections, projecting on opposite sides thereof and engaging the inner walls of the barrel, and means for clamping the sections upon the brush.

3. In a filter, the combination with a casing, of a cap located on one end of the same and having a tubular projecting boss, a filtering-barrel located within the casing and abutted against the boss, said barrel having its bore alined with the bore of the boss, a nozzle threaded upon the boss and having a valve-chamber, a valve-stem movably mounted in the nozzle and projecting into the barrel, a valve carried by the stem and movably located in the chamber, said valve coacting with the end of the boss and said end constituting a valve-seat for the same, and a cleaning device mounted on the stem and operating in the filtering-barrel.

4. In a filter, a tubular casing having an inlet, a discharge-nozzle, and a nozzle for filtered water, in combination with an open-ended filtering-barrel having a water-tight connection at its ends with the casing and spaced at its outer side from the inner wall of the casing, a valve-seat located in the casing between the end of the barrel and the nozzle, a valve-stem extending through the casing, the valve-seat, and the barrel, a brush carried by the stem and movably located in the barrel at one side of the valve-seat, and a valve carried by the stem and located in the casing on the opposite side of the seat and outside the barrel, said valve being movable into and out of coaction with the seat upon the movement of the stem, and said brush operating against the barrel during the movement of the stem.

In testimony that I claim the foregoing as my own I have hereto affixed my signature in the presence of two witnesses.

CHRISTIAN HEILRATH.

Witnesses:

W. F. GORMLEY,

GEO. FRISBIE.